UNITED STATES PATENT OFFICE.

JOHN MORGAN, OF STEPHEN'S GREEN NORTH, DUBLIN, IRELAND.

PRESERVING HUMAN BODIES, &c.

Specification forming part of Letters Patent No. 44,495, dated September 27, 1864.

*To all whom it may concern:*

Be it known that I, JOHN MORGAN, of Stephen's Green North, in the city of Dublin, Ireland, have invented Improvements in Embalming and Preserving from Decomposition Human Bodies and Bodies of other Animals, also in pickling, curing, and flavoring animal bodies; and the following is a full, clear, and exact description of the principle or character which distinguishes them from all other things before known, and of the usual manner of making, modifying, and using the same.

My said invention consists in introducing into animal bodies preservative fluids by means of the natural channels of the circulation, whereby structures are permeated by the fluids, whether for preservation for the purpose merely of embalmment, as in the case of human bodies, where poisonous solutions may be used for the purpose of the dissecting-room, or preservation in sealed cases of glass or other material in place of coffins, to be kept in mausoleums, vaults, or otherwise. It further consists in preserving, curing, or preparing animal bodies intended to be used for food—such as beef, swine, and all the mammalia and birds, as well as the lower animals—in some instances by impregnating their bodies with salt, salt and saltpeter, salt and muriate of ammonia, or other salts or materials for preservative, flavoring, coloring, medicating, and other purposes.

I propose by this process to cure and preserve not only the bodies but the hides of animals where it is desired.

*For embalmment of human bodies.*—In embalming human bodies the breast-bone or sternum is to be first cut down the center, or the cartilages of the ribs where they join the sternum are to be divided, and the sternum or breast-bone raised up. The pericardium, or bag containing the heart, will be thereby exposed. Open this longitudinally and transversely, so that the surface of the heart will be exposed. An incision is then made in the left ventricle—that is, on the left-hand side of the mark or furrow that is on the front of the heart; or an incision may be made in the aorta or great vessel near the base of the heart, and a pipe or tube of about eight inches in length introduced into this vessel. A stout twine doubled is then to be passed underneath this vessel near the base of the heart, the finger and thumb grasping the vessel; or a large aneurism-needle or curved wire may be used, if more convenient. It will now be found that the finger and thumb or cord, if tied, will inclose two vessels, into one of which the pipe is introduced. The other, which is softer and not so large, (in front of aorta,) leads to the lungs. Tie the cord, having made two of it, round these two vessels, the pipe being in the hinder one, and fasten the cords when securely tied to the pipe near its outer end, which must be provided with a stop-cock, hitching the cord over the stop-cock, so that the pipe cannot slip out of the vessel. To the outer end also is a coupling, such as gas-fitters use, which can be coupled with another stop-cock, having a pipe about two inches long at each side. One end is to fit the coupling, and the other end to fit into a piece of india-rubber tubing well tied on, which, at a few inches off, may have a piece of glass tubing inserted for convenience, so that the course of the fluid may be observed. I recommend the tubing to be half-inch in diameter, and from twelve to fifteen feet long. Any tubing that bears heat will do; but this is more convenient. The tubing must be connected at the farther end with a vessel capable of containing fluid, either hot or cold, which vessel should be raised from about twelve to fifteen feet above the subject to be operated on. In place of this simple arrangement for obtaining head-pressure, any ordinary pumping-machine, hydropult, or hydraulic forcing apparatus may be used for injecting the fluid to a greater height. That part of the heart known as the "right auricular appendix" must now be found. It is an offset from the cavity into which all the venous or returning blood of the body goes, and in the subject some time dead will be found to contain coagulated blood. The tip is to be cut off or an incision made in it. The coupling between the two stop-cocks—that is, the one between pipe in aorta and the stop-cock attached to india-rubber tube before mentioned—is now to be connected, taking care that both cocks are turned off or shut. One gallon and a half of the following solution (No. 1) is then to be introduced into the raised vessel hereinbefore referred to. It should be by preference at blood-heat; but cold will answer, if the subject has been dead some time: six pounds of common salt, one and one-half pound of nitrate of potash, one and one-half pound of powdered alum, two drams to one ounce of arseniate of potash, if in very hot countries where flies, &c., are troublesome. The stop-cock next the india-rubber tube is now opened, and the air contained between the two stop-cocks allowed to escape up the tube. Then allow half a gallon of the above solution to run in. It will be found to rush through the circulatory organs and out at the incision in the right auricular appendix. In animals some time dead it should be let in slowly, so that the coagulated blood may be dissolved, and the sulphate of alum and poisonous material in this case should be omitted till the next stage. When the fluid has ceased running from the incision, put on a clamp, or with a broad forceps with sliding catch embrace the right auricular appendix, including the incision or ligature, the right auricular appendix, in any way, so as to seal or close it. Now, turn on the remaining gallon containing alum and arseniate of potash or other poisonous solution, when it will be found that the fluid not being able to escape from the incision in the auricular appendix, will penetrate through the capillaries and small vessels in every tissue of the body. This will suffice to keep the bodies for a considerable length of time. For dissecting or such purposes the alum and poisonous solution may be omitted. During the operation the subject should have the legs a little lower than the rest of the body and all resting pretty flat. If it be desirable still further to preserve the body, the following solution (No. 2) will be found both cheap and efficacious: three quarts methylated spirit, three ounces of tannin, three ounces oil of thyme, three ounces oil of rosemary, three drams oil of cloves, thirty drops of oil of winter-green, to be introduced in the same way, or with an ordinary syringe in from six to twelve hours after the first operations. The pulmonary artery should also be opened, and one quart and a half of preserving-fluid No. 1 introduced, sufficient to make it run from the mouth, and one quart of No. 2 fluid in an hour after. All the mammalia and birds being constructed on the same plan, the same principle will apply, modified as to size and amount of material and composition of material used as fluid for preserving. The subjects should, after the operation, be left lying in a cool dry place and in a current of air. In twenty four hours the eyelids should be neatly stitched or glued down, also the mouth closed, a little wool or cotton impregnated with No. 2 solution being first introduced therein. The pipe or clamp should not be removed till from six to eight hours, when the incision in the chest should be treated in the same way and stitched. Should it be desired to preserve permanently the subjects, they should be further dried for a few days by exposure in a current of air and turned on sides and front every six hours, and when pretty dry placed in a molded glass coffin with movable lid, which can be sealed down with a heated solution of two parts of gutta-percha, one part of pitch, and one-quarter part of marine glue.

In curing swine, beef, &c., first kill the animal by knocking on the head with a heavy blunt maul, or by blowing air into the jugular or other vein, or by making openings into the chest and forcing in air or water into the cavity of the chest, so as to collapse the lungs. I recommend the blow on the head when properly done as most efficacious of all. So soon as the animal's struggles are over lay it on a table on its back and open the breast bone, sawing it right down the center, passing in the fingers at the incision and clearing away the fat and the two manuary veins, which run pretty close on each side. Open the bag containing the heart, when the right auricular appendage will be seen full of dark-colored blood. Make an incision into the nearest part— its tip, if possible—a good snip with a pair of scissors being the best, when the blood will rush out. Then lay the animal on its face for a minute or so, and afterward hang it up by a chain attached to the hind legs for a few minutes, when the whole of the blood will be run off. The animal should then be scalded or singed, as may be required. If singed, a wet cloth should be introduced into the opening made in the flesh. Then make an incision into the left ventricle—that is, at the (animal's) left side of the furrow on the front of the heart— and pass a pipe twelve inches or so in length into the aorta or great vessel, which leads from this cavity. Pass a stout double twine under this vessel close to the heart, where the finger and thumb can meet, and tie it securely. It will be found that the twine includes the aorta or large vessel with the pipe in it and another vessel in front of the aorta, leading to the lungs. The end of the pipe should not be inserted more than an inch or so into the vessel, and this pipe is to be furnished, within two inches of the outer end, with a stop-cock, over which the ends of the twine are to be hitched, in order to prevent the pipe from slipping out of its place. The outer end must have a coupling to fit another stop-cock having a pipe two inches in length or more at either side—one end for coupling and the other to fit into an india-rubber tubing of from half inch to three-quarters inch in diameter, and to be well tied on, the india-rubber tubing to be six or eight feet long—and sufficient lead pipe provided to connect it with a vessel situated twelve or fifteen feet above the level of the table on which the animal is placed. Introduce into this vessel some hot pickle at 90° to 100°, saturated strength. Two quarts will suffice for an ordinary pig. Connect the coupling and open the stop-cock to the india-rubber tube, in order to permit the air contained between it and the second stop-cock, which is turned off, to escape. The air can be seen escaping upward in the form of a bubble, if a piece of glass tube be inserted in this india-rubber tubing. Both stopcocks may now be opened by degrees, when the fluid will be seen rushing out at the incision in the auricular appendix or cavity when run through. A clamp or very broad forceps, with a sliding catch, should be applied to this appendix, so as to include the cut. The appendix is mentioned, as being the most convenient. Any part of the right side of heart would answer, or the two large veins that lead to heart, and the pickle, hot as before, again turned on, but with the addition of half pound of saltpeter to each ordinary pig, and, if a brighter color be desired, two hundred grains or more of sal-ammoniac, or a little cochineal or other harmless coloring, may be added. One gallon of fluid I find quite sufficient; but any quantity that the particular market or public requirements demand can be used. The animal may now lie a few hours—say from one hour to six—then disemboweled, split, if necessary, hung up six or eight hours, if possible, by the hind legs and six or eight hours by the fore legs, and placed the next day in a drying-loft; or the middles may be put from twenty-four hours to three days or more in salt, and hams from three to six days or more, according to taste, requirements, and time of year. The animal, after being knocked down, may be singed without the incision being made, if it be opened and operated upon directly after singeing; or an animal dying choked or smothered can be so treated by letting the first part of the process of washing out be done slowly, some saltpeter being put in the pickle. Sugar, spices in decoction, or other condiments can be thus introduced with the greatest ease, a very small quantity, according to taste, sufficing.

In preparing navy and cask provisions, the above process is to be used with beasts and pork, adding molasses and spices according to taste and as required by the authorities. Lime-juice or antiscorbutic salts may also be introduced when desired. The proportion for beasts is about six pounds of salt and one-half pound of saltpeter to the hundred-weight. This is to be packed in casks in the ordinary way, the spaces filled up with pickle, two pounds of salt to the hundred-weight of meat being added, the whole to be barreled tightly. Meat prepared in the manner above described is not liable to become hard, is more nutritious, and can be made of a much less scorbutic nature, and more agreeable to the palate than by ordinary process of curing.

For the purpose of medication, iron, iodine, and other remedies can by this process be diffused through the animal with flavorings of any kind. In all cases the proportions of the ingredients of the injecting-fluids will be varied according to circumstances, and the fluids may be used either separately or as auxiliary to other processes now in use.

Having now described and particularly ascertained the nature of my invention and the manner in which the same is used or carried into effect, I would observe, in conclusion, that what I consider to be novel and original, and therefore claim as the invention secured to me by the hereinbefore in part recited Letters Patent, is the herein-described process, consisting of two distinct operations—viz: first, thoroughly removing the blood from the veins and arteries, which is accomplished by driving a current of liquid through the circulating channels; second, saturating the tissues by means of the preservative fluid forced into them, and which is accomplished by closing the auricular appendix. I would therefore state my claims as follows:

1. The embalming or preserving of human bodies and the preserving, pickling, curing, medicating, and flavoring of animal bodies generally by forcing or injecting preservative or antiseptic fluids through the natural channels of the circulation of the blood, as hereinbefore described, clearing the blood out of the capillaries and small vessels, and causing preservative fluids, by the process above mentioned, to saturate the tissues of the body by filtration and otherwise.

2. The application and use of the hereinbefore-mentioned peculiar preservative fluids, in the manner and for the purposes specified.

In testimony whereof I have signed my name to this specification before two subscribing witnesses.

JOHN MORGAN.

Witnesses:
JAMES P. BYRNE,
JOHN O'CONNER.